United States Patent [19]

Kobayashi

[11] Patent Number: 5,300,670

[45] Date of Patent: Apr. 5, 1994

[54] FLUOROSILICONE POLYMER AND CURABLE FLUOROSILICONE POLYMER COMPOSITION

[75] Inventor: Hideki Kobayashi, Chiba, Japan

[73] Assignee: Dow Corning Toray Silicone Co., Ltd., Tokyo, Japan

[21] Appl. No.: 35,012

[22] Filed: Mar. 22, 1993

[30] Foreign Application Priority Data

Apr. 27, 1992 [JP] Japan ................... 4-134213

[51] Int. Cl.⁵ ................................ C07F 7/08
[52] U.S. Cl. ......................... 556/454; 528/15
[58] Field of Search ............. 556/454, 450; 528/15

[56] References Cited

U.S. PATENT DOCUMENTS

| | | | |
|---|---|---|---|
| 4,574,149 | 3/1986 | Lee et al. | 556/454 X |
| 4,727,172 | 2/1988 | Yamamoto et al. | 556/454 X |
| 4,736,048 | 4/1988 | Brown et al. | 556/454 |
| 4,842,902 | 6/1989 | Brown et al. | 427/387 |
| 4,897,459 | 1/1990 | Evans | 556/454 X |
| 4,977,289 | 12/1990 | Evans | 556/454 X |
| 4,980,443 | 12/1990 | Kendziorski et al. | 556/454 X |
| 5,028,679 | 7/1991 | Terae et al. | 556/454 X |
| 5,041,594 | 8/1991 | Herzig | 556/454 X |
| 5,098,981 | 3/1992 | Saho et al. | 556/454 X |

FOREIGN PATENT DOCUMENTS 378420 7/1990 European Pat. Off. .
535597 4/1993 European Pat. Off. .
48901 10/1988 Japan .

Primary Examiner—Paul F. Shaver
Attorney, Agent, or Firm—Alexander Weitz

[57] ABSTRACT

A fluorosilicone polymer, and a curable composition having utility as a release coating which contains the polymer, are disclosed, said polymer having the structure

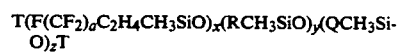

wherein T is a monovalent group selected from triorganosiloxy radicals or hydroxyl radical, R is a monovalent group selected from hydrocarbon radicals or substituted hydrocarbon radicals, Q is an alkenyl radical having 4 to 8 carbon atoms, a is an integer having a value of at least 4, x, and z are integers, each having a value of at least 1, y is an interger having a value of 0 or at least 1, with the proviso that $(x+y+z) \geq 50$, $x/(x+y+z) \geq 0.25$ and $z/(x+y+z) \leq 0.1$.

20 Claims, No Drawings

FLUOROSILICONE POLYMER AND CURABLE FLUOROSILICONE POLYMER COMPOSITION

FIELD OF THE INVENTION

This invention relates a type of fluorosilicone polymer and to a curable fluorosilicone polymer composition.

BACKGROUND OF THE INVENTION

In the prior art, it has been known for a long time that by forming a peelable curable coating on the surface of various substrate materials such as paper, synthetic resin film, synthetic fiber cloth, etc., it is possible to obtain a material which displays a release property with respect to pressure-sensitive adhesive or other adhesive substances. Usually, a curable organopolysiloxane composition is used as the material for forming the release coating. Examples include curable organopolysiloxane compositions made of vinyl radical-containing organopolysiloxane, organohydrodienepolysiloxane having silicon-bonded hydrogen atoms, organic compound having perfluoroalkyl radicals, and platinum series compound (see Japanese Kokoku Patent Application No. Sho 63-48901) and curable organopolysiloxane compositions made of diorganopolysiloxane containing fluoroalkyl radicals and vinyl radicals, organohydrogenpolysiloxane, and platinum series compound (Japanese Kokai Patent Application No. Sho 63-320). However, for these conventional types of curable organopolysiloxane compositions, the curing rate is low, and the release character is poor.

SUMMARY OF THE INVENTION

The object of this invention is to solve the aforementioned problems by providing a type of fluorosilicone polymer composition characterized by the fact that it has a high curing rate and it can form a cured coating with a low surface tension after curing. This invention also provides a type of novel fluorosilicone polymer used as the main component of the aforementioned fluorosilicone polymer composition.

This invention therefore provides a type of fluorosilicone polymer having the formula

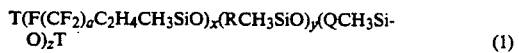
(1)

where T represents a trioganosiloxy radical or hydroxyl radical; R represents a monovalent hydrocarbon or substituted hydrocarbon radical, Q represents a C4-8 alkenyl radical, a is an integer equal to or larger than 4, x is an integer equal to or larger than 1, y is 0 or an integer equal to or larger than 1, and z is integer equal to or larger than 1, with the proviso that $(x+y+z) \geq 50$, $x/(x+y+z) \geq 0.25$ and $z/(x+y+z) \leq 0.1$.

The present invention also relates to a type of curable fluorosilicone polymer composition comprising (A) the above described fluorosilicone polymer (1);
(B) an organohydrogenpolysiloxane which has two or more silicon-bonded hydrogen atoms on average in each molecule, said hydrogen atoms being bonded to different silicon atoms thereof;
(C) a catalyst for hydrosilylation; and
(D) an inhibitor for the catalyst.

DETAILED DESCRIPTION OF THE INVENTION

According to this invention, the fluorosilicone polymer used is represented by formula

(1)

where T represents a triorganosiloxy radical or hydroxyl radical. Preferably, the triorganosiloxy radical is selected from dimethylalkylsiloxy, dimethylfluoroalkylsiloxy or trialkylsiloxy radicals. Examples of the triorganosiloxy radicals that may be used include trimethylsiloxy radical, dimethylvinylsiloxy radical, 5-hexenyldimethylsiloxy radical, $F(CF_2)_aC_2H_4(CH_3)_2SiO$ radical, etc. In formula (1), R represents a monovalent hydrocarbon radical having 1 to 12 carbon atoms, such as methyl radical, ethyl radical, or other alkyl radical; phenyl radical or a substituted hydrocarbon radical, such as, trifluoropropyl radical. Preferably, R has $\leq 6$ carbon atoms, methyl radical being preferred. Q represents an alkenyl radical having 4 to 8 carbons, such as hexenyl radical, heptenyl radical, butenyl radical, and pentenyl radical. Among them, hexenyl radical is preferred. The subscript "a" represents an integer equal to or larger than 4, usually 12 or smaller, such as 4, 6, or 8. The subscript "x" represents an integer equal to or larger than 1. The subscript "y" represents 0 or an integer equal to or larger than 1. The subscript "z" represents an integer equal to or larger than 1. The sum of x, y, and z, that is, $(x+y+z)$, is an integer equal to or larger than 50, $x/(x+y+z)$ is $\geq 0.25$, $z/(x+y+z)$ is 0.1 or smaller.

According to this invention, the units of $(F(CF_2)_aC_2H_4CH_3SiO)$ in the fluorosilicone polymer are the necessary structural units needed for realizing a low surface tension. The units of $(QCH_3SiO)$ are the units needed for obtaining the curable composition to be described infra. According to this invention, when a vinyl radical or allyl radical is used in place of Q in the fluorosilicone polymer, the curing rate decreases or a completely cured coating just cannot form. That is, it has been found that the units of $(QCH_3SiO)$ are needed for realizing a high curing rate and for realizing a completely cured state. Although the reason is not yet clear, it is believed that, because the fluoroalkyl side chains of the units of $(F(CF_2)aC_2H_4CH_3SiO)$ are long, the short side chains such as vinyl radicals or allyl radicals, could be sterically hindered.

According to this invention, the fluorosilicone polymer is used as the main component of the following listed curable composition. That is, the curable fluorosilicone polymer composition comprises the following components:

(A) The fluorosilicone polymer represented by formula (1),
(B) an organohydrogenpolysiloxane which has on average two or more silicon-bonded hydrogen atoms in each molecule, with these hydrogen atoms bonded to different silicon atoms, (C) a catalyst for hydrosilylation, and (D) an inhibitor for the hydrosilylation catalyst.

According to this invention, the organohydrogenpolysiloxane (B) used in the curable fluorosilicone polymer composition is a crosslinking agent for component (A). In order to act as a crosslinking agent, it has to have two or more silicon-bonded hydrogen atoms in each molecule. Examples of the organohydrogenpolysiloxane include:

i) $(CH_3)_3SiO((CH_3)_2SiO)_p(CH_3HSiO)_qSi(CH_3)_3$ (where p and q are integers equal to or larger than 2)

ii) $(CH_3)_3SiO(F(CF_2)_aC_2H_4CH_3SiO)_r(CH_3HSiO)_q\text{-}Si(CH_3)_3$ (where r and q are integers equal to or larger than 2)

iii) $(CH_3)_3SiO(F(CF_2)_aC_2H_4CH_3SiO)_r(CH_3SiO)_pp(CH_3HSiO)_qSi(CH_3)_3$ (where p, q and r are integers equal to or larger than 2, and a is an integer equal to or larger than 4)

iv) $(CH_3)_2HSiO(F(CF_2)_aC_2H_4CH_3SiO)_r(CH_3HSiO)_qSiH(CH_3)_2$ (where r and q are integers equal to or larger than 2)

v) $(CH_3)_2HSiO(F(CF_2)_aC_2H_4CH_3SiO)_r((CH_3)_2SiO)_p(CH_3HSiO)_qSiH(CH_3)_2$ (where p, q and r are integers equal to or larger than 2, and a is an integer equal to or larger than 4)

vi) $(CH_3)_2HSiO(F(CF_2)_aC_2H_4CH_3SiO)_r((CH_3)_2SiO)_qSiH(CH_3)_2$ (where r and q are integers equal to or larger than 2)

vii) copolymers made of methyl(perfluorobutylethyl)siloxane units, dimethylhydrodgen siloxane units, and $SiO_2$ units etc. In particular, in order to have a good compatibility with component (A), the above types (ii), (iii), (iv), and (v) are preferred.

The amount of this component should be appropriate to ensure that the ratio of the molar amount of the silicon-bonded hydrogen atoms in this component to the sum of the molar amount of the alkenyl radicals in the composition is in the range of (0.5:1)–(20:1), preferably in the range of (0.5:1–3:1). Usually, for 100 parts by weight of component (A), its amount is in the range of 0.3–40 parts by weight. This is because if the amount of component (B) is too small, the cure rate is too low. On the other hand, if the amount of component (B) is too large, the peeling property of the cured coating tends to decrease.

According to this invention, the catalyst for the hydrosilylation reaction used as component (C) is a catalyst for crosslinking and curing components (A) and (B). Examples include micron-size platinum particles adsorbed on a carbon powder carrier, chloroplatinic acid, alcohol-modified chloroplatinic acid, olefin complex of chloroplatinic acid, coordination compound of chloroplatinic acid and divinyldisiloxane, platinum black, palladium, rhodium catalyst, etc. The amount of the component is appropriate for a catalyst. Usually, for 1 million parts by weight of component (A), the amount of the catalyst should be in the range of 0.1–100 parts by weight.

According to this invention, the inhibitor for the hydrosilylation catalyst used as component (D) acts to suppress the catalytic activity of the hydrosilylation catalyst at room temperature, and it is used to improve the storage stability of this composition at room temperature. Examples of component (D) include 3-methyl-1-butyn-3-ol, 3,5-dimethyl-1-hexyn-3-ol, 3-methyl-1-pentyn-3-ol, phenylbutynol, and other alkynyl alcohols; 3-methyl-3-pentene-1-yne, 3.5-dimethyl-1-hexene-3-yne, (tetramethylvinylsiloxane) cyclic compound, bis(2-methoxyisopropyl) maleate, and benzotriazole.

If needed, the composition may also be diluted with an organic solvent. Examples of the organic solvents that may be used include tetrahydrofuran and other ethers; methyl isobutyl ketone and other ketones: trifluorotoluene, hexafluoroxylene, and other aromatic hydrocarbons; trichloroethylene, perchloroethylene, 1,1,1-trichloroethane, dichloroethane, 1,1,2-trichlorotrifluoroethane, and other halogenated hydrocarbons; $CHCl_2CF_3$, $CH_3CCl_2F$ and other HCFC-type solvents, inter alia. It is preferred that the aforementioned organic solvents be used so as to improve the storage stability of this composition and to improve the coatability on various types of substrates.

The composition of this invention can be manufactured easily by blending said components (A)–(D) or by blending components (A)–(D) together with the organic solvent to form a uniform mixture.

The curable fluorosilicone polymer composition of this invention can be coated on the surface of a glass plate, metal sheet, paper, synthetic resin film, cloth, or other substrates, followed by heat treatment to form a cured coating having a low surface tension. The heat treatment may be performed at a temperature in the range of 120°–150° C. for a heating time of 20–30 sec. The obtained cured coating has a low surface tension, and hence it has an excellent mold release property, and the cured coating also has excellent water repellency, and oil repellency. In addition, it displays an excellent mold release property with respect to adhesives, in particular the pressure-sensitive silicone adhesives.

As explained above, the fluorosilicone polymer of this invention is useful as the feed material for forming a cured coating having a low surface tension. In addition, for the curable fluorosilicone polymer composition of this invention, because a cured coating with a low surface tension can be formed after curing, it can be used to form a cured coating with an excellent mold release property, water repellency and oil repellency. In addition, it can be used as a mold release agent for silicone pressure-sensitive adhesive.

APPLICATION EXAMPLES

In the following, this invention will be explained in more detail with reference to application examples. In these application examples, Vi represents vinyl groups.

APPLICATION EXAMPLE 1

Five grams of zinc oxide, 100 g of xylene hexafluoride, and 70 g of ethyl acetate were loaded in a flask, followed by heating with reflux. Then, while being stirred, a mixture of 122 g of $F(CF_2)_8C_2H_4CH_3SiCl_2$, 1 g of $CH_2=CHC_4H_8CH_3SiCl_2$, and 45 g of xylene hexafluoride was added dropwise. After addition was completed, heating with reflux was continued for 2 hours, followed by cooling. Then 100 g of water and 45 g of hydrochloric acid were added. The separated organic layer was further washed with water till it was neutral, followed by removal of ethyl acetate, thus forming an oil-like substance. The oil-like substance was analyzed by means of gel permeation chromatography (GPC) using monodisperse polydimethylsiloxane as a standard, and it was found that the weight average molecular weight (Mw) of the polymer formed was 6,700. Then 400 ppm of trifluoromethane sulfonic acid were added to the polymer for polymerization at 50° C. for 10 hours, forming a polymer with an Mw of 50,000. From the results of the GPC analysis and nuclear magnetic resonance (NMR) analysis, it was found that the polymer had the structure:

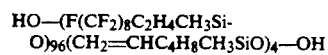

APPLICATION EXAMPLE 2

Four hundred grams of water were loaded into a flask. While the contents were stirred, a mixture of 361 g of $F(CF_2)_4C_2H_4CH_3SiCl_2$, 129 g of $(CH_3)_2SiCl_2$, 4 g of $CH_2=CHC_4H_8CH_3SiCl_2$, and 500 g of heptane was added dropwise. After the end of this addition, stirring was continued for 2 hours, and then it was allowed to sit. The separated organic layer was further washed with water to neutralize it. Then a water trap was installed to remove the water by heating at reflux. The heptane was removed under a reduced pressure to provide an oil-like substance. Then 3.9 g of a compound represented by $(CH_3)_2ViSiO((CH_3)_2SiO)_{10}Si(CH_3)_2Vi$ and KOH in an amount appropriate to ensure a Si/K ratio of 5000 were added, followed by polymerization at 110° C. for 10 h. Carbon dioxide gas was blown into the aforementioned reaction system for neutralization, followed by removal of the volatile components under a vacuum to result in an oil-like polymer. From the analytical results, it was found that the polymer had the structure $$(CH_3)_2ViSiO(F(CF_2)_4C_2H_4CH_3SiO)_{200}((CH_3)_2SiO)_{200}(CH_2=CHC_4H_8CH_3SiO)_4Si(CH_3)_2Vi$$

APPLICATION EXAMPLE 3

Twenty grams of the polymer obtained in Application Example 1, 1 g of the compound represented by formula $(CH_3)_2HSiO(F(CF_2)_4C_2H_4CH_3SiO)_3((CH_3)_2SiO)_3(CH_3HSiO)_3Si(CH_3)_2H$ and 40 g of 1,1,2-trichlorotrifluoroethane were blended uniformly. Then 0.01 g of bis(2-methoxyisopropyl) maleate and a complex of chloroplatinic acid and divinyltetramethylsiloxane with an amount corresponding to 50 ppm of metallic platinum were added and blended. This composition was coated on a glass plate, followed by heat treatment at 150° C. for 30 sec, forming a fully cured coating. The contact angle of the cured coating was measured using the liquid droplet method with the aid of a contact angle meter manufactured by Kyowa Surface Chemistry Co., Ltd.. Each round of measurement was performed for 10 liquid droplets, and the mean value was then used as the contact angle. It was found that the contact angle for water was 121°, the contact angle for methylene iodide was 105°, and the contact angle for n-hexadecane was 71°.

APPLICATION EXAMPLE 4

Ten grams of the polymer obtained in Application Example 2, 1 g of the compound represented by formula $(CH_3)_2HSiO(F(CF_2)_4C_2H_4CH_3SiO)_3((CH_3)_2SiO)_8Si(CH_3)_2H$ and 40 g of 1,1,2-trichlorotrifluoroethane were blended uniformly. Then 0.01 g of bis(2-methoxyisopropyl) maleate and a complex of chloroplatinic acid and divinyltetramethylsiloxane with an amount corresponding to 50 ppm of metallic platinum were added and blended. This composition was coated on a glass plate, followed by heat treatment at 150° C. for 30 sec, forming a fully cured coating. Then the contact angle of the cured coating was measured. It was found that the contact angle for water was 110°, and the contact angle for methylene iodide was 80°.

COMPARATIVE EXAMPLE 1

An oil-like polymer represented by the formula $HO-(F(CF_2)_8C_2H_4CH_3SiO)_{100}(CH_2=CHCH_3SiO)_4-OH$, as in Application Example 1, was prepared in the same way as in Application Example 1 except that 0.71 g of $CH_2=CHCH_3SiCl_2$ was used in place of 1 g of $CH_2=CHC_4H_8CH_3SiCl_2$ used in Application Example 1.

Twenty grams of the polymer obtained above, 1 g of the compound represented by formula $$(CH_3)_2HSiO(F(CF_2)_4C_2H_4CH_3SiO)_3((CH_3)_2SiO)_3(CH_3HSiO)_3Si(Ch_3)_2H,$$

and 40 g of 1,1,2-trichlorotrifluoroethane were blended uniformly. Then 0.01 g of bis(2-methoxyisopropyl) maleate and a complex of chloroplatinic acid and divinyltetramethylsiloxane with an amount corresponding to 50 ppm of metallic platinum were added and blended to form a curable organopolysiloxane composition. This composition was coated on a glass plate, followed by heat treatment at 150° C. for 30 sec. However, a fully cured coating was not formed.

COMPARATIVE EXAMPLE 2

An oil-like polymer was prepared in the same way as in Application Example 2 except that 1.42 g of $CH_2=CHCH_3SiCl_2$ was used in place of 2 g of $CH_2=CHC_4H_8CH_3SiCl_2$ used in Application Example 2. Ten grams of the polymer obtained above, 1 g of the compound represented by formula $(CH_3)_2HSiO(F(CF_2)_4C_2H_4CH_3SiO)_3((CH_3)_2SiO)_8Si(CH_3)_2H$ and 40 g of 1,1,2-trichlorotrifluoroethane were blended uniformly. Then 0.01 g of bis(2-methoxyisopropyl) maleate and a complex of chloroplatinic acid and divinyltetramethylsiloxane with an amount corresponding to 50 ppm of metallic platinum were added and blended to form a curable organopolysiloxane composition. This composition was coated on a glass plate, followed by heat treatment at 150° C. for 30 sec. However, a fully cured coating was not formed.

That which is claimed is:

1. A fluorosilicone polymer selected from the group consisting of polymers having the formula $$T(F(CF_2)_aC_2H_4CH_3SiO)_x(QCH_3SiO)_zT$$

and polymers having the formula $$T(F(CF_2)_aC_2H_4CH_3SiO)_x(RCH_3SiO)_y(QCH_3SiO)_zT$$

wherein T is a monovalent group selected from the group consisting of a triorganosiloxy radicals and hydroxyl radical, R is a monovalent group selected from the group consisting of hydrocarbon radicals and substituted hydrocarbon radicals, Q is an alkenyl radical having 4 to 8 carbon atoms, a is an integer having a value of at least 4, x, y and z are integers, each having a value of at least 1, the proviso that $(x+y+z) \geq 50$, $x/(x+y+z) \geq 0.25$ and $z/(x+y+z) \leq 0.1$.

2. The fluorosilicone polymer of claim 1, wherein R is selected from the group consisting of methyl, ethyl, phenyl and trifluoropropyl radicals.

3. The fluorosilicone polymer of claim 2 wherein T is selected from the group consisting of trimethylsiloxy, dimethylvinylsiloxy, 5-hexenyldimethylsiloxy and hydroxyl radicals.

4. The fluorosilicone polymer of claim 3, wherein a is 4 to 12, inclusive.

5. The fluorosilicone polymer of claim 4, wherein R is a methyl radical.

6. The fluorosilicone polymer of claim 5, wherein Q is a hexenyl radical.

7. The fluorosilicone polymer of claim 6, wherein a is 4 to 8, inclusive.

8. A curable fluorosilicone polymer composition comprising:
(A) A fluorosilicone polymer selected from the group consisting of polymers having the formula $$T(F(CF_2)_aC_2H_4CH_3SiO)_x(QCH_3SiO)_zT$$

and polymers having the formula $$T(F(CF_2)_aC_2H_4CH_3SiO)_x(RCH_3SiO)_y(QCH_3SiO)_zT$$

wherein T is a monovalent group selected from the group consisting of a triorganosiloxy radicals and hydroxyl radical, R is a monovalent group selected from the group consisting of hydrocarbon radicals and substituted hydrocarbon radicals. Q is an alkenyl radical having 4 to 8 carbon atoms, a is an integer having a value of at least 4, x, y and z are integers, each having a value of at least 1, with the proviso that $(x+y+z) \geq 50$, $x/(x+y+z) \geq 0.25$ and $z/(x+y+z) \leq 0.1$;

(B) an organohydrogenpolysiloxane having on average at least two silicon-bonded hydrogen atoms in each molecule, said hydrogen atoms being bonded to different silicon atoms and the amount of said organohydrogenpolysiloxane being such that the molar ratio said silicon-bonded hydrogen to the total of alkenyl groups in said composition is 0.5:1 to 20:1;

(C) a curing amount of a hydrosilylation catalyst: and (D) an inhibitor for said catalyst, 9. The composition according to claim 8, wherein R of said fluorocarbon polymer (A) is selected from the group consisting of methyl, ethyl, phenyl and trifluoropropyl radicals.

10. The composition according to claim 9, wherein T of said fluorocarbon polymer (A) is selected from the group consisting of trimethylsiloxy, dimethylvinylsiloxy, 5-hexenyldimethylsiloxy and hydroxyl radicals.

11. The composition according to claim 10, wherein a of said fluorocarbon polymer (A) is 4 to 12, inclusive.

12. The composition according to claim 11, wherein R of said fluorocarbon polymer (A) is a methyl radical.

13. The composition according to claim 12, wherein Q of said fluorocarbon polymer (A) is a hexenyl radical.

14. The composition according to claim 13, wherein a of said fluorocarbon polymer (A) is 4 to 8, inclusive.

15. A fluorosilicone polymer having the formula $$T(F(CF_2)_aC_2H_4CH_3SiO)_x(RCH_3SiO)_y(QCH_3SiO)_zT$$

wherein T is a monovalent group selected from the group consisting of a triorganosiloxy radicals and hydroxyl radical, R is a monovalent group selected from the group consisting of hydrocarbon radicals and substituted hydrocarbon radicals, Q is a hexenyl radical, a is an integer having a value of at least 4, x and z are integers, each having a value of at least 1, y is 0 or an integer having a value of at least 1, with the proviso that $(x+y+z) \geq 50$, $x/(x+y+z) \geq 0.25$ and $z/(x+y+z) \leq 0.1$.

16. The fluorosilicone polymer of claim 15, wherein R is selected from the group consisting of methyl, ethyl, phenyl and trifluoropropyl radicals.

17. The fluorosilicone polymer of claim 16, wherein a is 4 to 12, inclusive.

18. A curable fluorosilicone polymer composition comprising:
(A) A fluorosilicone having the formula $$T(F(CF_2)_aC_2H_4CH_3SiO)_x(RCH_3SiO)_y(QCH_3SiO)_zT$$

wherein T is a monovalent group selected from the group consisting of a triorganosiloxy radicals and hydroxyl radical, R is a monovalent group selected from the group consisting of hydrocarbon radicals and substituted hydrocarbon radicals, Q is a hexenyl radical having 4 to 8 carbon atoms, a is an integer having a value of at least 4, x and z are integers, each having a value of at least 1, y is 0 or an integer having a value of at least 1, with the proviso that $(x+y+z) \geq 50$, $x/(x+y+z) \geq 0.25$ and $z/(x+y+z) \leq 0.1$;

(B) an organohydrogenpolysiloxane having an average at least two silicon-bonded hydrogen atoms in each molecule, said hydrogen atoms being bonded to different silicon atoms and the amount of said organohydrogenpolysiloxane being such that the molar ratio said silicon-bonded hydrogen to the total of alkenyl groups in said composition is 0.5:1 to 20:1;

(C) a curing amount of a hydrosilylation catalyst; and (D) an inhibitor for said catalyst.

19. The composition according to claim 18, wherein R of said fluorocarbon polymer (A) is selected from the group consisting of methyl, ethyl, phenyl and trifluoropropyl radicals.

20. The composition according to claim 19, wherein a of said fluorocarbon polymer (A) is 4 to 12, inclusive.

* * * * *